Oct. 24, 1950     P. C. LITTLE ET AL     2,527,435
HOLDER FOR SOLDERING IRONS
Filed Jan. 18, 1949
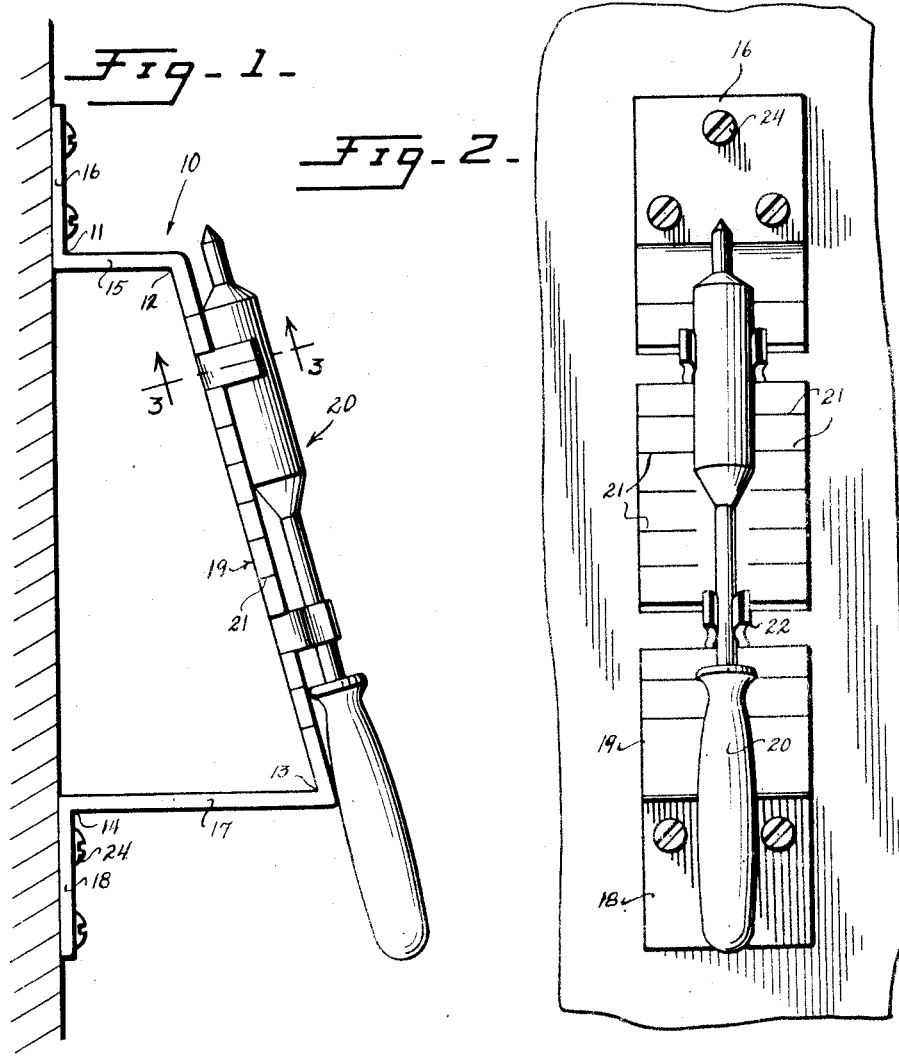
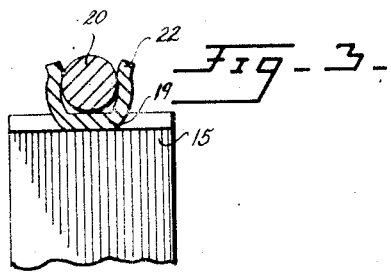
INVENTORS
*PAUL C. LITTLE*
BY *MARVIN W. SPARROW*
Agent

Patented Oct. 24, 1950

2,527,435

UNITED STATES PATENT OFFICE 2,527,435

HOLDER FOR SOLDERING IRONS

Paul C. Little, Hoboken, N. J., and Marvin W. Sparrow, Brooklyn, N. Y.

Application January 18, 1949, Serial No. 71,456

4 Claims. (Cl. 248—316)

In general, the present invention relates to a tool holder, and in its more specific aspect has reference to a holder for soldering irons. Of course, devices have heretofore been provided for supporting a soldering iron either during use or non-use of the iron, but these prior constructions have generally been rather complicated in structural detail and, in addition, can be used with but a single type of soldering iron.

Another objection is that the iron is generally supported in an approximately horizontal position which is not as satisfactory as maintaining the iron in an upright or substantially vertical position. Accordingly, an important object of our invention is to provide a holder for soldering irons which will overcome the above and other disadvantageous features now present in the art.

A further object of this invention is to provide a holder for soldering irons which will firmly hold the iron when not in use and yet permit the easy removal of the iron from the holder when desired.

Another object of our invention is to provide a holder for soldering irons which is so constructed as to support the iron in an upright position, thereby enabling the tip of the iron to be more quickly heated and at the same time permit the handle to remain cooler than would be the case if the iron were supported in a horizontal position.

Yet a further object of the present invention is to provide a holder for soldering irons and the like which can be easily adapted to support irons of various sizes and contours.

Another object of our invention is to provide a soldering iron holder of the character described which can be cheaply and easily manufactured and readily secured to or detached from a suitable supporting surface.

To achieve the above and other objects, the invention comprises a sheet metal body so shaped as to provide a mounting leg at each end thereof whereby the body may be secured to the desired supporting surface, the portion of the body intermediate the mounting legs being angularly disposed and spaced outwardly from the mounting legs for serving as a supporting surface for the iron. The intermediate portion of the body is also provided with a plurality of spaced opposed tabs along each edge thereof whereby the requisite tabs may be bent inwardly of the body to engage the iron and thereby support the iron in a substantially upright position.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 is a view in side elevation of the soldering iron holder.

Figure 2 is a front view of the holder shown in Figure 1.

Figure 3 is a sectional view taken along the line 3—3, looking in the direction of the arrows, the view being taken on Figure 1.

The tool holder comprises a rectangular body 10 of sheet metal, preferably #14 gauge, the body being provided with bend lines 11, 12, 13 and 14 extending transversely of the body, and the distance between the lines 13 and 14 being greater than that between lines 11 and 12, the purpose of which will be more fully described.

In assembling or setting up the holder, the body is bent inwardly along the line 12 to form a horizontal surface 15 and then upwardly along the line 11 to provide an extension-like member 16, the member 16 being at right angles to the surface 15. Similarly, the body is bent inwardly along the line 13, thus forming a horizontal surface 17 which is in parallel relation to the surface 15, and then outwardly along the line 14 to form a vertical extension 18 which will be in alinement with the extension-like member 16. In view of the fact that the horizontal surface 17 is of greater length than the surface 15, that portion of the body intermediate such surfaces is inclined upwardly and inwardly, thereby forming a supporting surface 19 for the iron designated 20.

Each longitudinal edge of the supporting surface 19 is slitted inwardly a substantial distance, as indicated at 21, thus providing tab-like elements 22 intermediate the slits 21. The slits 21 may be spaced an equal distance apart or an unequal distance and preferably these slits extend substantially the entire length of the supporting surface 19. To mount the body 10 to a supporting surface such as a wall or the like, each of the extension-like members 16 and 18 is provided with a plurality of spaced apertures 23 for receiving screws or the like 24 whereby the holder may be removably secured to the wall. With the holder thus attached, the iron 20 is disposed upon the supporting surface 19 and the desired tabs 22 are then bent inwardly to engage the iron to firmly support the iron on the surface 19. We have found that, generally speaking, if one pair of tabs is bent inwardly to engage the heating element of the iron and a second pair to engage the shank intermediate the heating element and the handle, the iron will be properly and firmly supported. Hence, it will be noted that the iron will be secured to the surface 19 with the tip thereof in an upright position, and in view of the fact that heat always rises, the tip will be heated much faster and the handle portion will remain cooler than would be the case if the iron was supported in a level position. Obviously, the iron may be readily removed from the surface 19 with a minimum of effort on the part of the user and can, of course, be quickly replaced on the surface 19 when not in use. By mounting the holder on the wall or on the back of the work bench, for example, the iron is always within easy reach and is out of the way, which means when the iron is still hot, there is little danger of a person being accidentally burned by coming in contact with the tip of the iron.

By the provision of the plurality of tabs which extend longitudinally of the supporting surface 19, it is believed clear that the holder may be readily used with all types of soldering irons by bending inwardly the proper tabs 22 which, of course, is a marked advantage over the iron supports now in use.

In lieu of mounting the holder to a wall, the extensions 16 and 18 can be secured to a suitable base which can be disposed upon a work bench or other surface.

The invention is not to be confined to any strict conformity with the showing in the drawing but may be changed or modified so long as such changes or modifications mark no material departure from the salient features of the invention as expressed in the appended claims.

We claim:

1. A holder for soldering irons comprising a supporting surface, means to secure said supporting surface to a suitable support whereby said surface will be angularly disposed with respect to the support, and said supporting surface being provided with opposed spaced slits extending inwardly from each edge of the surface, the portion intermediate the slits being adapted to be bent inwardly of the surface to form tabs on said supporting surface for engaging the iron for securing the iron to the supporting surface.

2. A holder for soldering irons comprising a supporting surface, means to secure said supporting surface to a suitable support whereby said surface will be angularly disposed with respect to the support, and a plurality of opposed tabs on each edge of said supporting surface whereby the desired tabs may be moved into engagement with the soldering iron to secure the iron to the supporting surface.

3. A holder for soldering irons comprising a rectangular sheet metal body having a horizontal portion integrally formed with the body at each end thereof, an extension integral with each horizontal portion and at right angles thereto thereby forming mounting elements for the holder, and said body intermediate the horizontal portions having a plurality of opposed slits extending inwardly from each edge of the body, the said slits being adapted to be bent inwardly of the body to provide tabs for engaging the iron.

4. A holder as claimed in claim 3 wherein the lower horizontal portion is of greater length than the upper horizontal portion so that the intermediate portion is inclined from the lower horizontal portion to the upper horizontal portion.

PAUL C. LITTLE.
MARVIN W. SPARROW.

REFERENCES CITED

The following references are of record in the file of this patent:

UNITED STATES PATENTS

| Number | Name | Date |
|---|---|---|
| 1,222,458 | Peterson | Apr. 10, 1917 |
| 1,355,462 | Francis | Oct. 12, 1920 |
| 1,821,305 | Hauenstein | Sept. 1, 1931 |
| 2,448,227 | McCan | Aug. 31, 1948 |